United States Patent [19]
Snitko et al.

[11] 3,922,906
[45] Dec. 2, 1975

[54] METHOD OF LOCATING THE CENTER OF GRAVITY ETC.

[76] Inventors: Nikolai Konstantinovich Snitko, ulitsa Tavricheskaya, 2, kv. 78; Nikolai Ivanovich Ryndin, ulitsa Chaikovskogo, 77, kv. 22; Alexei Alexeevich Yanson, ulitsa Parkhomenko, 37, kv. 80; Inna Ivanovna Vovk, Nevsky prospekt, 114, kv. 31; Samuil Noevich Shvarts, ulitsa Dybenko, 23 korpus 1, kv. 88; Arseny Mikhailovich Pavlov, ulitsa Plekhanova, 44, kv. 27, all of Leningrad, U.S.S.R.

[22] Filed: Mar. 1, 1974

[21] Appl. No.: 447,389

Related U.S. Application Data
[63] Continuation of Ser. No. 352,303, April 18, 1973, abandoned.

[30] Foreign Application Priority Data
Jan. 26, 1971 U.S.S.R. .............................. 1615561

[52] U.S. Cl. ................................................... 73/65

[51] Int. Cl.² ......................................... G01M 1/12
[58] Field of Search ................................. 73/65

[56] References Cited
UNITED STATES PATENTS
1,788,824   1/1931   Coughtry ............................. 73/65

Primary Examiner—James J. Gill
Attorney, Agent, or Firm—Holman & Stern

[57] ABSTRACT

The apparatus has a vessel filled with a fluid and arranged so as to accommodate that part of a homogeneous object which is to be measured and is inseparable from same. The vessel is provided with a level gauge for determining the buoyant force coming into play when the part to be measured is immersed into the fluid while the object is being held fast in the clamping arrangement of a suspension over the vessel. Provided on the suspension body is a means of measuring the moments of buoyant force in given planes. By immersing in succession the portions of the part measured, the parameters of each portion are determined and then those of the entire part are measured.

5 Claims, 3 Drawing Figures

METHOD OF LOCATING THE CENTER OF GRAVITY ETC.

CROSS REFERENCE TO THE RELATED APPLICATION

This application is a continuation of Ser. No. 352,303 filed on Apr. 18, 1973, now abandoned.

BACKGROUND OF THE INVENTION

The present invention relates to measuring technique and can find application in locating coordinates of the centers of gravity of parts of an irregularly shaped homogenous object.

There are known various methods of locating coordinates of the center of gravity of a homogenous object and apparatus for embodying same. Known by way of example is a method characterized in that the weight moments in three given reference planes and the weight of the object measured are determined and then the three coordinates of the center of gravity of the object are found by calculation. For embodying this method, there exists an apparatus comprising an orthogonal spider frame at one end of which is secured the body to be measured and at the three other ends there are arranged knife edges and weights pans. The spider is supported by means of a ball resting on a pad and is brought into balance integrally with the body it accommodates by placing weights on weights pans until the pointer of an indicator reads zero. The beams of weights pans being of known length, the weight moments can be calculated from the weights used. The weight of the object is determined by weighing it separately.

Also known is an apparatus comprising a platform with horizontal orthogonal levers along which are movable weights, with flat horizontal levels, a clamp to hold fast the object measured and a pivotal support in the form of a twin knife-edge suspension whose horizontal knife edges meet at right angles. The weight moments of the object measured are determined by means of sliding weights and the weight of the object is determined by weighing it separately.

Further known is an apparatus comprising a curved beam assembly (a suspension whose center of gravity is located at a known distance below the line of support and whose angle of deflection is a measure of the moment applied to the curved beam assembly) which rests with its two knife edges on pads secured in a frame. The object measured is clamped to the curved beam assembly and the weight moment of the object is determined from the angle of deflection of the curved beam assembly integrally with the object, the angle being measured with the aid of a transparent scale secured to the curved beam asaembly and an optical system with a reference hair secured to the frame. The weight of object is determined by separate weighing.

There is also known an apparatus consisting of a curved beam assembly with two knife edges resting on frame pads, a clamping arrangement for holding the object measured, a dash pot and an induction device for measuring the angle of the deflection of curved beam assembly. The weight moment of the object clamped in the curved beam assembly is determined from the angle of deflection of the assembly. In order to ascertain the weight of the object this is weighed separately.

Known is another apparatus comprising a platform with a pivoting support so arranged that the center of gravity of the platform with all components mounted thereon coincides with the point of support. Mounted on the platform are a clamp for securing the object measured and two electric motors imparting, through the agency of drive screws, motion to two balancing weights which move in the plane of platform in two directions at right angles to each other. The platform is also provided with two tubular spirit levels serving to determine if the platform is occupying zero position. On installing the object to be measured in the clamping arrangement of the platform, the balancing weights are moved by the motors until the platform is restored to zero position. Two weight moments of the object measured are determined from the distance travelled by the two balancing weights. The weight of object is ascertain by separate weighing.

Also known is an apparatus comprising a platform resting on strain gauges at three points. The platform is provided with a clamping arrangement to secure the object to be measured and with a mechanism serving to rotate the object about a horizontal axis. On installing the body measured on the platform, the reactions at the three points of support are determined and then the object is turned through 90° about the horizontal axis and the reactions are determined once more. From the values of the six bearing reactions of the platform with the object installed on it, the three weight moments, the weight of object and the three coordinates of its center of gravity are determined.

Another method of locating the coordinates of the center of gravity of an object is characterized in that the object to be measured is secured in a suspension pivotally mounted on a frame so that the center of gravity of suspension coincides with a line described by the pivot in tilting. While the vertical distance between the line described by the pivot in tilting and the center of gravity of the object measured is known then the coordinate of the center of gravity can be calculated from the angle of deflection of the suspension with the object measured installed in it.

The apparatus embodying the method incorporates a suspension with two knife edges which form the line of tilting and rest on frame pads. The suspension is provided with a clamping arrangement for securing the object to be measured and with a pointer of an optical equipment serving to measure the angle of deflection of the suspension. The object to be measured is secured in the suspension whose center of gravity passes through the axis of deflection. The angle of deflection of the suspension with the object secured to it is measured by means of the optical equipment provided on the frame.

Also known is an apparatus comprising a suspension with two knife edges forming the line of tilting characterized in that, unlike the former apparatus, it has a mechanism which rotates the object measured about a vertical axis integrally with the suspension, and a damping arrangement for damping out the oscillations of the suspension with the object measured being mounted thereon.

Another apparatus features a suspension with two knife edges forming the line of tilting of the suspension, this apparatus differing from the foregoing one in that the device for measuring the angle of tilt of the suspension with the object measured being mounted thereon is an electrically-operated component with contact points.

Also known is an apparatus incorporating a suspension whose center of gravity coincides with the axis of tilting of a pivot which, unlike other constructions, is an air bearing.

All the known methods of locating the coordinates of the center of gravity of objects and the apparatus for embodying same are of no avail if it is sought to locate the coordinates of the center of gravity of just one part of a solid homogenous object having any shape without destroying the latter.

SUMMARY OF THE INVENTION

It is an object of the present invention to provide such a method of locating the center of gravity of a homogenous object which will allow to determine the coordinates of the center of gravity of a part of the object, the masses of the part and the mass moments.

Another object of the present invention is to provide a method of locating the center of gravity of a homogenous object which will permit the determination of the coordinates of the centers of gravity of the portions which constitute the measured part of a homogenous object, the masses of the portions and the mass moments.

A further object of the present invention is to provide an apparatus embodying a method of locating the center of gravity of a homogenous object which apparatus will permit the determination of the coordinates of the center of gravity of a part of the object, the mass of the part and the mass moments.

A still further object of the presnt invention is to provide an apparatus embodying a method of locating the center of gravity of a homogenous object which apparatus will permit the determination of the coordinates of the centers of gravity of the portions which constitute the measured part of the homogenous object, the masses of the portions and the mass moments.

The abovementioned objects of the present invention and the advantages it may offer are attained by the fact that in a method of locating the center of gravity of a homogeneous object based on the known relationship which the coordinate of the center of gravity in each given plane bears with respect to the weight of object and the moment of the weight in the plane, the coordinates of the center of gravity of an inseparable part of a solid object are located, according to the invention, by immersing the part into a fluid and measuring the buoyant force and the moments of the force in two given vertical orthogonal planes in which the sought coordinates of the center of gravity of the part are determined. This method of locating the center of gravity of a homogenous object, unlike the other methods, enables the location of two horizontal coordinates of the center of gravity and two mass moments of an inseparable part of a homogenous solid object without destroying the latter.

In another embodiment of the present invention, the portions which constitute the measured part of an object are immersed into the fluid one after another, the portions being confined by the surface of the object and imaginary planes which separate the portions one from another and run parallel to an imaginary plane separating the part under the measurement, then the buoyant forces coming into play due to the immersion of each constituent portion are measured and so are the vertical coordinates of the points at which the forces are applied, and the mass of each portion, the mass of the entire part under the measurement and the vertical coordinates of the center of gravity of the measured part of object are determined.

During each successive immersion of the portions which constitute the measured part of object it is preferred to measure the moments in two vertical planes of the buoyant forces due to the immersion of each portion and then to determine the mass moments of each portion of the measured part of object in given vertical planes and two horizontal coordinates of the center of gravity of each portion from which the measured part of object is made up.

The method disclosed herein provides for the location of the coordinates of the center of gravity and for the determination of mass moments of the portions which constitute measured part of a homogenous object.

In an apparatus embodying the method of locating the centre of gravity of a homogenous object according to the invention there is a vessel filled with fluid for the purpose of immersing the measured part of object therein and a means of measuring the buoyant force in the form of a level gauge comprising two commuicating vessels connected by means of a tube with two scales, one gauging the level of fluid in the vessel and the other one gauging the level at which the object measured has been immersed, The apparatus disclosed herein provides for a high degree of accuracy in measuring the magnitude and moment of the buoyant force due to the immersion of an inseparable part of a homogenous object into a fluid.

According to an embodiment of the invention, the apparatus may be provided wth an arrangement serving to orientate the homogenous object with respect to the means of measuring moments which arrangement comprises a carriage, a drive screw imparting motion to the carriage and a detent locking the carriage in various positions with respect to the means of measuring moments. An arrangement of this kind adds to the accuracy obtainable by the apparatus in locating the coordinates of the center of gravity and in determining the mass moments of the measured part of object.

BRIEF DESCRIPTION OF THE DRAWINGS

The present invention will be best understood from the following description of a preferred embodiment when read in conjunction with the accompanying drawings wherein.

DETAILED DESCRIPTION OF A PREFERRED EMBODIMENT

Figure 1:
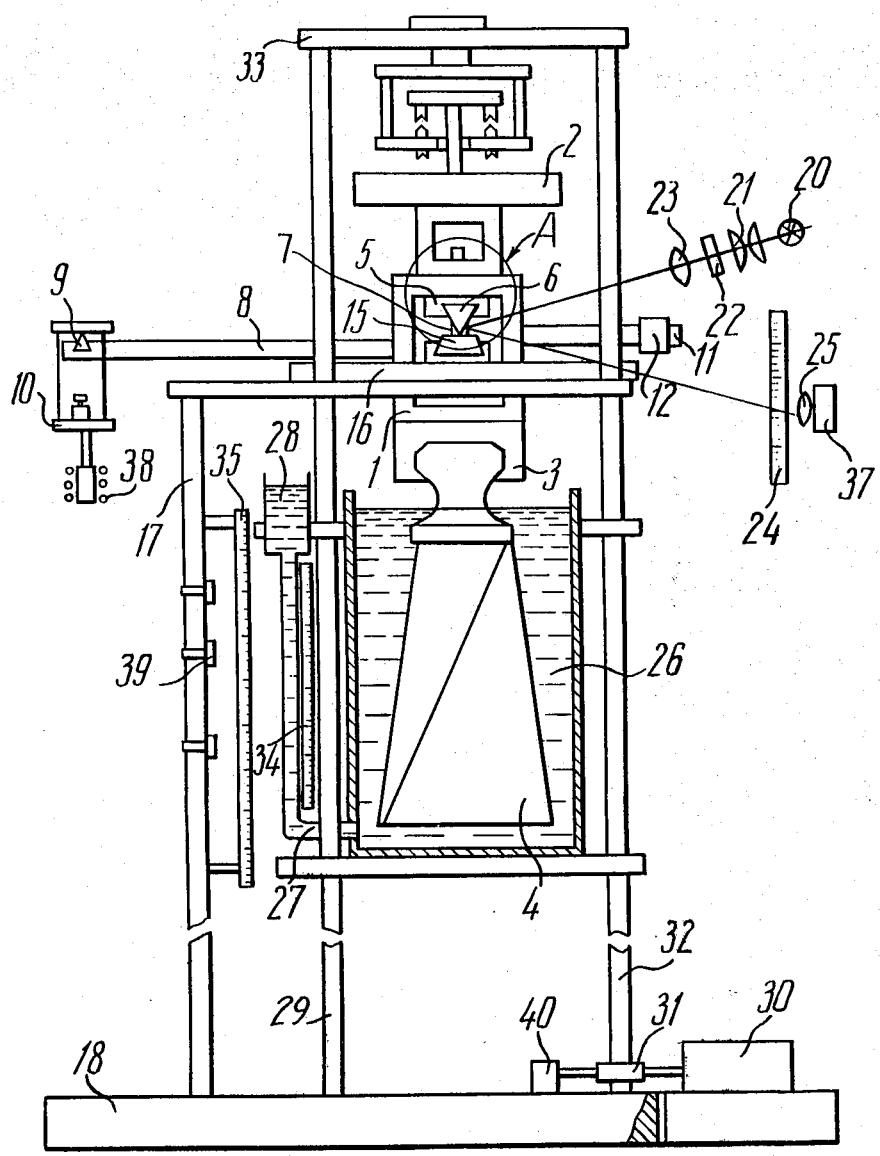
FIG. 1 is a front elevation view of the apparatus embodying the method according to the invention.
Figure 2:
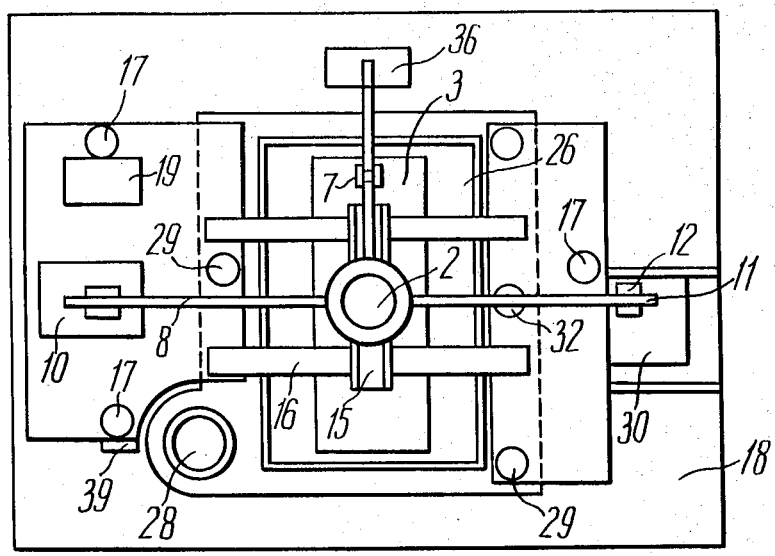
FIG. 2 is a plan view of the apparatus illustrated in FIG. 1.
Figure 3:
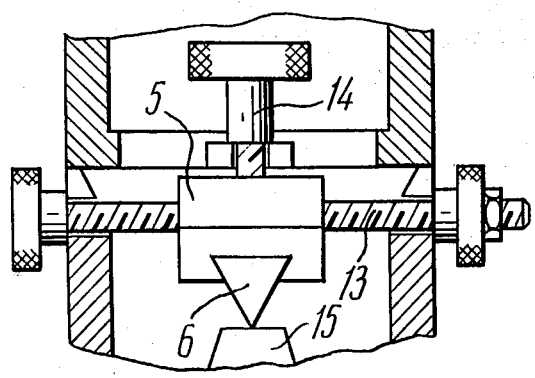
FIG. 3 is an enlarged view of the components inside circle A of FIG. 1.

The apparatus shown in FIGS. 1 through 3 comprises a suspension which consists of a body 1 with a counterpoise 2, an exchangeable clamp 3 for accommodating an object 4 under the test, a carriage 5 with a knife edge 6 and a mirror 7, a lever 8 with a weights pan supported by a knife edge 9 and a balancing arrangement 10, a lever 11 wiht a counterpoise 12. The carriage 5 is adapted to move with respect to the suspension by means of guides and a drive screw 13 and can be secured in any position on the suspension by a set screw 14.

The suspension can oscillate about the knife edge 6 which receives support from a pad 15 linked up with pillars 17 of a bed plate 18 by means of beams 16. To indicate zero position of the suspension, there is a zero indicator 19 which is an optical equipment consisting of a light source 20, a condenser 21, a transparent plate 22 with hair, an objective lens 23, a scale 24 and an eyepiece 25.

A vessel 26 serving to accommodate the object tested can move vertically along guide bars 29 of the bed plate 18 integrally with a level gauge comprising a tube 27 and a level gauge vessel 28. The drive is obtained from an electric motor 30 installed on a separate foundation and operating through the intermediary of a reducer 31 and a drive screw 32. Topping the guide bars 29 is an arrester 33.

The level gauge is provided with two scales, scale 34 being linked up with the vessel 26 and scale 35 attached to a pillar 17 of the bed plate 18. A damping arrangement 36 is incorporated into the apparatus.

Measurements are taken automatically with the aid of a photocell 37 of the zero indicator 19, an automatic balancing arrangement 38, photocells 39 of the level gauge scale 35, a revolution counter 40 of the reducer 31 which operate in conjunction with the computing unit and direct-reading indicators providing data on the coordinates of the center of gravity, moment and mass of the part of the object tested (not shown in the drawings).

The apparatus operates as follows. While mounting the apparatus, the bed plate 18 and the pad 15 are to be levelled. Preparatory to measurements, an exchangeable clamp 3 is attached to the suspension and the carriage 5 with the knife edge 6 is moved along the guides of the body 1, using the drive screw 13, and secured by means of a set screw 14 a position where the axis about which the knife edge is tilting is in a vertical plane with respect to which the coordinates of the centers of gravity of parts of an object under the test and their static moments are going to be determined.

Manipulating then with the counterpoises, the center of gravity of the suspension is brought into alignment with the axis of oscillation of the suspension. The scale 24 of the zero indicator 19 is set to zero. The vessel 26 with the level gauge is brought into its lowermost position and filled with two non-miscible fluids which have roughly the same specific gravity but differ in color. The zero mark on the scale 34 is brought into alignment with the interface of the two fluids in the level gauge and graduation is noted on the scale 35 at a level to which the fluid in the vessel 26 is to be raised in the course of measurements. This level depends on the location of the part whose coordinates of the center of gravity are to be determined.

An object 4 to be tested is installed into the clamp 3 and the moment of object is brought at balance by a force, $F_1$, applied by means of the balancing arrangement 10 operating in conjunction with the zero indicator 19. Cutting in the electric motor 30 makes the vessel 26 with the level gauge move along the guide bars 29 until the interface of the two liquids in the level gauge registers with the graduation noted on the scale 35. Bringing the object tested at balance again by a force $F_2$, the static moment, $M$, of the immersed part of the object can be determined from the equation:

$$M = A(F_2 - F_1), A = L \frac{\rho_1}{\rho_2} = \text{const.},$$

where $\rho_1$ = density of the material of the object tested;
$\rho_2$ = density of the fluid in the vessel 26;
$L$ = distance between the knife edges 6 and 9;
$A$ = constant coefficient.

Upon reading from the scale 34 the height, $h$, to which the interface of fluids has risen in the level gauge, the mass, $m$, of the immersed part of the object tested is determined by the equation:

$$m = B.h \quad B = \rho_1 \frac{\rho_3}{\rho_2} S_2 \frac{S_1}{S_3} = \text{const.}$$

where
$\rho_3$ = density of the fluid in the level gauge;
$S_1$ = cross-sectional area of the vessel 26;
$S_2$ = cross-sectional area of the level gauge tube 27;
$S_3$ = cross-sectional area of the level gauge vessel 28;
$B$ = constant coefficient.

The buoyant force, $P$, is determined from $$P = m.g. \frac{\rho_2}{\rho_1}$$

where $g$ = acceleration due to gravity.

The coordinate of the center of gravity $y$ of the immersed part of the object tested is determined from the formula:

$$y = C \frac{F_2 - F_1}{h}; C = \frac{L}{\rho_3 S_2} - \frac{S_3}{S_1'} = \text{const.},$$

where $C$ = constant coefficient.

More particularly, two immiscible liquids of different colors are used in the present apparatus to accurately measure the small liquid volume which will be displaced by a small portion of the object being measured upon immersion. That is, when the liquid level in the vessels 26 and 28 rises imperceptibly to the eye, the dividing surface between the liquids in the tube 27 covers a considerable distance that can either be recorded visually on the scales 34 and 35 or with the help of photocells 39. As indicated above, the zero point of the scale 34 is aligned with the dividing boundary in the tube 27 before the object is immersed into the liquid, and on the scale 35 the mark or photocell 39 is set at a level corresponding to the point to which the liquid is to be raised in the vessel 26 during measurements. If, for example, the object is to be immersed to a depth of one inch, the mark or photocell 39 on the scale 35 is set at a distance $h_1 = 1 \, \rho_2/\rho_3 \cdot S_3/S_2$ inches above the end of the object being measured. In that case when the object, connected via the base with the scale 35, is immersed 1 inch into the liquid of the vessel 26, the dividing line in the tube 27 will reach, by the rule of communicating vessels, the level $h_1$ on the scale 35 and the level $h$ on the scale 34. The movement of level $h_1$ is composed of the movement of the dividing line $h$ inside the tube 27 and the movement $h_2$ of the tube itself. At the same time, the height to which the liquid surface in the vessel 26 rises relative to the scale 35 by the amount one inch $= h_1 \, \rho_3/\rho_2 \cdot S_2/S_3$ and will be composed of the height $h \, \rho_3/\rho_2 \cdot S_2/S_3$ to which said surface rises in the vessel 26 due to the liquid being displaced by the immersed part of the object (according to the rule of communicating vessels), plus the height $h_2$ to which the vessel itself rises. The height $h_2$ to which the vessel 26 rises may be described by the formula $h_2 = K.n$, where $n$ is the number of revolutions made by the reducer 31, and $K$ is a constant coefficient predetermined by the design of the reducer 31. In that case, $h_1 \rho_3/\rho_2 \cdot S_2/S_3 = h \rho_3/\rho_2 \cdot S_2/S_3 + K.n$. The height $h \rho_3/\rho_2 \cdot S_2/S_3$ to which the liquid surface rises in the vessel 26 determines the mass $m$ of the immersed part of the homogeneous object which is calculated from the formula given above.

When the automatic system of measurement is in use, the electric motor 30 serving to lift the vessel 26 is cut off by the photocell 39 set to the corresponding graduation on the scale 35 as soon as the interface in the level gauge reaches this graduation; the photocell 39 sets into operation the automatic balancing arrangement 38 which determines the balancing force, $F_2$, with the aid of the photocell 37 of the zero indicator 19 and transmits a relevant signal to the computing unit. The mass of the immersed part of the object tested is determined by the formula $$m = B \cdot h_1 - \rho_1 S_1 Kn;$$

where $h_1$ = level set on the scale 35 (its value is put into the computing unit by the operator);

$K$ = constant coefficient which depends on the design of the reducer 31;

$n$ = number of revolutions made by the reducer 31.

The number of revolutions of the reducer 31 is registered by the revolution counter 40 and transmitted to the computing unit whose output is fed to the indicators which read the values of the coordinate of the center of gravity of the immersed part of the object tested, its moment and mass.

In other words, by way of a specific example, when an automatic measurement system is used, the height $h \rho_3/\rho_2 \cdot S_2/S_3$ to which the liquid surface rises in the vessel 26 is determined as the difference between the height one inch = $h_1 \rho_3/\rho_2 \cdot S_2/S_3$ of the liquid in the vessel 26 rising relative to the scale 35, when the dividing surface is the tube 27 reaches a height $h_1 = \rho_2/\rho_3 \cdot S_3/S_2$ and the height $h_2 = K.n$ to which the vessel 26 itself rises.

In that case, $$h \frac{\rho_3}{\rho_2} \frac{S_2}{S_3} = h_1 \frac{\rho_3}{\rho_2} \frac{S_2}{S_3} - K.n,$$

and $$m = \rho_1 \cdot hS_1 \frac{\rho_2}{\rho_2} \frac{S_2}{S_3} = \rho_1 \cdot S_1 h_1 \cdot \frac{\rho_2}{\rho_2} \frac{S_2}{S_3} - \rho_1 \cdot S_1 K.n;$$
$$m = B.h_1 - \rho_1 \cdot S_1 \cdot K.n.$$

To locate the center of gravity of the portions which constitute the measured part of the object and are confined by the surface of object and imaginary planes separating the portions one from another and running parallel to an imaginary plane serving to separate the part measured from the object, the portions of object are immersed one after another into the fluid. On measuring the buoyant forces due to the immersion of each constituent portion and locating the vertical coordinates of the points where these forces are applied at, the mass of each such portion is determined. After that, the moments of buoyant forces due to the immersion of each portion are determined in two vertical planes and then the mass moments of each portion of the part of object measured are determined in the given vertical planes and so are the two horizontal coordinates of the center of gravity of each portion.

To summarize the above-described operation, the entire body is balanced about pivot 6 by adjustment of the balancing means 10. The portion of the body whose moments about pivot 6 it is desired to determine is then immersed in liquid of a known density. Since the density of the entire body is known and the body is homogeneous, the mass of the portion of the body is determined by the volume of liquid displaced. The moments are determined by the adjustment of balancing means 10 required to rebalance the immersed body about pivot 6. The body is then removed from the liquid, turned through an angle of 90°, rebalanced on pivot 6, reimmersed in the liquid, and the balancing forces required to bring the immersed body into balance are again detected.

Numerous variations of the above-described preferred embodiment will suggest themselves to a person of ordinary skill in the art. It is therefore to be understood that within the scope of the appended claims, the invention may be practiced otherwise than as specifically described herein.

What is claimed is:

1. A method of calculating the center of gravity of a homogeneous object, based on a known relationship in which the coordinates of the center of gravity in each given plane depends on the weight of said object and on the moment of said weight in said plane, comprising the steps of: balancing said object with respect to two orthogonal horizontal axes; immersing the inseparable measured part of said object into a fluid in order to locate the coordinates of the center of gravity of said part; measuring the buoyant force which appears as a result of said immersion step; and measuring the moment of said buoyant force in two given vertical orthogonal planes, whereby the sourght coordinates of the center of gravity of said part of said object may be calculated.

2. The method according to claim 1, wherein during successive immersions of the portions constituting said measured part of said object into said fluid, said portions being defined by the surface of said object and imaginary planes separating said portions from one another and running parallel to an imaginary plane defining said measured part, the buoyant forces which appear due to immersion of each constituent portion are measured, and the vertical coordinates of the fulcrum of these forces are located as a basis for calculating the mass of each of said portions, the mass of the entire measured part, and the vertical coordinate of the center of gravity of the entire said measured part of said object.

3. The method according to claim 2, wherein during the successive immersions of said portions of the measured part of said object into said fluid, the moments of buoyant forces which appear due to immersions of each said portion are measured in two vertical planes on a basis for calculating the mass moments and the two horizontal coordinates of the center of gravity of each said portion of the measured part of said object in the given vertical planes and the two horizontal coordinates of the center of gravity of said measured part of said object.

4. An apparatus for locating the center of gravity of a part of a homogeneous object, comprising a vessel filled with a fluid for immersing the measured part of said object therein; means for measuring the magnitude of the buoyant force comprising a tube with a scale for measuring the level of the fluid in said vessel, one end of said tube being connected with said vessel and its other end being connected with another vessel, and a scale secured to the immovable part of said apparatus for measuring the level of immersion of said object; a clamp for holding fast said object therein, and means for measuring the moments of said object.

5. The apparatus according to claim 4, further comprising means for orienting said object with respect to said means for measuring the moments, said orienting means comprising a carriage, a drive screw for imparting motion to said carriage, and a detent for locking said carriage in various positions with respect to said means for measuring the moments.

* * * * *